United States Patent [19]

Takumi et al.

[11] 4,301,033

[45] Nov. 17, 1981

[54] HIGH APPARENT BULK DENSITY GAMMA ALUMINA CARRIER AND METHOD OF MANUFACTURE OF SAME

[75] Inventors: Shizuo Takumi, Kamakura; Toshio Hashimoto, Isehara; Fumio Akimoto, Hiratsuka, all of Japan

[73] Assignee: Nikki-Universal Co., Ltd., Tokyo, Japan

[21] Appl. No.: 87,267

[22] Filed: Oct. 22, 1979

[30] Foreign Application Priority Data

Nov. 6, 1978 [JP] Japan ............................... 53-136513

[51] Int. Cl.$^3$ ..................... B01J 37/00; B01J 35/08; C01F 7/22; C01F 7/02
[52] U.S. Cl. .................................. 252/448; 252/317; 252/463; 423/626; 423/628; 423/631
[58] Field of Search ................... 252/448, 463, 317; 423/626, 628, 631

[56] References Cited

U.S. PATENT DOCUMENTS

| | | | |
|---|---|---|---|
| 3,096,295 | 7/1963 | Michalko | 252/463 |
| 3,979,334 | 9/1976 | Lee et al. | 252/448 |
| 4,032,472 | 6/1977 | McCallister | 423/626 |
| 4,116,882 | 9/1978 | Bendig et al. | 252/463 |
| 4,169,874 | 10/1979 | Bambrick | 252/463 |

*Primary Examiner*—P. E. Konopka
*Attorney, Agent, or Firm*—Blanchard, Flynn, Thiel, Boutell & Tanis

[57] ABSTRACT

A catalyst carrier comprising gamma alumina wherein the apparent bulk density is in the range of from 0.65 g/cc to 0.71 g/cc, the total pore volume is in the range of from 0.55 cc/g to 0.65 cc/g, the content of pores having a diameter in the range of from 60A to 110A occupies at least 75% of the total pore volume, the surface area is in the range of from 210 m$^2$/g to 250 m$^2$/g and the attrition loss is less than 0.5 wt. %. This sort of catalyst carrier can be namufactured through a series of steps of: (a) preparing a first alumina hydrosol having an aluminum concentration in the range of from 9.8 wt. % to 14.4 wt. % and a weight ratio of aluminum to chloride in the range of from 0.95 to 1.20, (b) preparing a second alumina hydrosol having an aluminum concentration in the range of from 9.5 wt. % to 13.0 wt. % and a weight ratio of aluminum to chloride in the range of from 0.85 to 0.95 by adding hydrochloric acid to said first hydrosol, (c) preparing an alumina precursor having an aluminum concentration in the range of 6.0 wt. % to 7.0 wt. % by commingling said second hydrosol with a suitable gelling agent in an amount of from 1.65 to 1.85 times the chemical equivalent necessary to neutralize the chloride contained in the second hydrosol and (d) dispersing this precursor as droplets in a suspending medium thereby forming hydrogel particles, ageing the thus obtained hydrogel particles in said suspending medium and then in an aqueous ammonia, washing the aged particles in water, drying and calcining thereafter.

4 Claims, No Drawings

HIGH APPARENT BULK DENSITY GAMMA ALUMINA CARRIER AND METHOD OF MANUFACTURE OF SAME

BACKGROUND OF THE INVENTION

The present invention relates to a novel catalyst carrier comprising gamma alumina and method of manufacture of same.

It is well-known that gamma alumina particles which serve as a carrier substance of a catalyst composition can be manufactured by the oil-drop method utilizing alumina hydrosol or extrusion of gamma alumina powder. When comparing the oil dropped gamma alumina with the extruded gamma alumina, it may generally be said that the former is superior in physical strength, in particular, a low attrition loss, but it is low in apparent bulk density, while the latter is relatively high in apparent bulk density but it exhibits a considerably heavy attrition loss. Therefore, it is extremely importance to obtain gamma alumina having a high apparent bulk density by the oil-drop method.

A process of manufacturing spherical alumina is taught in U.S. Pat. No. 2,620,314. According thereto, spherical alumina is manufactured by the steps of commingling alumina hydrosol with a gelling agent which is hydrolyzable at an elevated temperature, dispersing the resulting mixture as droplets in a suspending medium thereby forming hydrogel particles, ageing the thus obtained hydrogel particles, washing with water, drying and calcining.

In the case of manufacturing spherical alumina by means of the oil-drop method, the apparent bulk density thereof may be increased or decreased to some extent by controlling the conditions for ageing the hydrogel particles, more particularly the ammonia concentration and temperature in the ammonia ageing step, but in order to manufacture higher apparent bulk density spherical alumina it is required that the weight ratio of aluminum to chloride should be lowered in the alumina hydrosol, per se, that is, the precursor of said spherical alumina.

In the case of the conventional alumina hydrosol employed in the oil-drop method, however, the weight ratio of aluminum to chloride is about 1.0 at the lowest, and an alumina hydrosol having a weight ratio lower than that, even if applied to the oil-drop method, can produce no satisfactory spherical alumina. The reasons therefor may be enumerated as follows. The first reason is that in the conventional method it is difficult to manufacture a uniform alumina hydrosol having a weight ratio of aluminum to chloride of less than 1.0. And the second reason is that it is difficult to make a mixture comprising such a uniform alumina hydrosol whose weight ratio of aluminum to chloride is 1 or less and a gelling agent such as hexamethylenetetramine or the like fulfill the necessary conditions suitable for the oil-drop method.

In this connection, the properties of the conventional gamma alumina manufactured by the oil-drop method are as shown in Table-1.

TABLE-1

| | |
|---|---|
| Apparent bulk density (g/cc) | 0.30–0.64 |
| Total pore volume (cc/g) | 0.55–0.65 |
| Content of micro pore having a diameter of 60–110A in total pore volume (%) | 70 or less |

TABLE-1-continued

| | |
|---|---|
| Surface area (m$^2$/g) | 210 or less |
| Average crushing strength (Kg) | 8 or less |
| Attrition loss* (wt. %) | 0.2 |

*denotes the percentage by weight of carrier substances powdered by placing carrier substances in the sample container of a vibrating blender mill and vibration-treating them at 3000 vibrations per minutes for 20 minutes.

To meet the demand for spherical alumina of high apparent bulk density, large surface area and improved physical strength such as crushing strength, attrition loss and so forth, we have carried out a series of investigations for the purpose of solving the aforesaid two problems to thereby develope a method of manufacturing spherical alumina of high apparent bulk density and further improved physical properties by means of the oil-drop method in the manner of exerting our ingenuity in the preparation of the alumina hydrosol as well as specifying the mixing ratio of the alumina hydrosol whose weight ratio of aluminum to chloride is 1 or less and a gelling agent and the concentration of aluminum in the resulting mixture.

SUMMARY OF THE INVENTION

The present invention provides a catalyst carrier comprising gamma alumina wherein the apparent bulk density is in the range of from 0.65 g/cc to 0.71 g/cc, the total pore volume is in the range of from 0.55 cc/g to 0.65 cc/g, the content of pores having a diameter in the range of from 60 A to 110 A occupies at least 75% of the total pore volume, the surface area is in the range of from 210 m$^2$/g to 250 m$^2$/g and the attrition loss is less than 0.5 wt.%.

And, the present invention comprises the steps of (a) preparing a first alumina hydrosol having an aluminum concentration in the range of from 9.8 wt.% to 14.4 wt.% and a weight ratio of aluminum to chloride in the range of from 0.95 to 1.20, (b) preparing a second uniform alumina hydrosol having an aluminum concentration in the range of from 9.5 wt.% to 13.0 wt.% and a weight ratio of aluminum to chloride in the range of from 0.85 to 0.95 by adding hydrochloric acid to said first hydrosol, (c) adding to said second alumina hydrosol a gelling agent which is hydrolyzable at an elevated temperature in an amount of from 1.65 to 1.85 times the chemical equivalent necessary to neutralize the chloride contained in the second alumina hydrosol to thereby regulate the aluminum concentration in the resulting mixture to be in the range of from 6.0 wt.% to 7.0 wt.%, and (d) dispersing this mixture as droplets in a suspending medium thereby forming hydrogel particles, ageing the thus obtained hydrogel particles in said suspending medium and then in an aqueous ammonia, washing with water, drying and calcining thereafter.

DETAILED DESCRIPTION OF THE INVENTION

The first alumina hydrosol of the present invention can be prepared typically by digesting metallic aluminum with hydrochloric acid. This first alumina hydrosol can also be prepared by reacting gibbsite with hydrochloric acid at an elevated temperature to thereby prepare a basic aluminum chloride solution having an aluminum concentration in the range of from 7 wt.% to 12 wt.% and a weight ratio of aluminum to chloride in the range of from 0.3 to 0.8 and further reacting this basic solution with metallic aluminum. Although gibbsite contains about 0.2 to 0.5 wt.% of sodium which acts as catalyst poison, when the first alumina hydrosol is prepared according to the aforesaid process, the sodium contained therein can be removed at the stage of washing gelated alumina particles with water. The first alumina hydrosol of the present invention is required in any case to have an aluminum concentration in the range of from 9.8 wt.% to 14.4 wt.% and a weight ratio of aluminum to chloride (which will be called Al/Cl ratio for short hereinafter) in the range of from 0.95 to 1.20.

According to the present invention, the above-mentioned first alumina hydrosol is subsequently added with hydrochloric acid to thereby prepare a second alumina hydrosol having an aluminum concentration in the range of from 9.5 wt.% to 13.0 wt.% and an Al/Cl ratio in the range of from 0.85 to 0.95. In this case, the narrower the width of Al/Cl ratio to be regulated by the addition of hydrochloric acid, the more the pore distribution of the finally obtained spherical alumina peaks within a narrow range centering from 60 A to 110 A. In manufacturing spherical alumina employed as a carrier of catalysts, therefore, it is preferable that the width of Al/Cl ratio to be regulated by adding hydrochloric acid should be set as narrowly as possible. Moreover, since it is fully anticipated that the structure of polymerization present in the first alumina hydrosol is cut off by the addition of hydrochloric acid, it is desirable that the aforesaid second alumina hydrosol should be aged at a temperature over 40° C. for more than 40 hours.

Next, the second alumina hydrosol according to the present invention is commingled with a gelling agent which is hydrolyzable at an elevated temperature. As the gelling agent for this purpose, such a weak base as hexamethylenetetramine, urea, or mixture thereof is useful. The mixing ratio of the gelling agent to the second alumina hydrosol and the aluminum concentration in the resulting mixture are important factors in the present invention in addition to the method for preparing the second alumina hydrosol.

That is, in the case of the present invention it is required that the mixing ratio of the gelling agent to the second alumina hydrosol should be in the range of from 1.65 to 1.85 times the chemical equivalent necessary to neutralize the chloride contained in said sol and the aluminum concentration in the thus obtained mixture should be in the range of from 6.0 wt.% to 7.0 wt.%. In each case where the amount of said gelling agent mixed is lower than the aforesaid range or the aluminum concentration in the mixture is lower than the aforesaid range, the mixture before oil-dropping may be maintained in the liquid phase, but when applying the oil-drop method to this mixture, in the former gelation is deteriorated and in the latter the finally obtained spherical alumina becomes brittle. And, even though the amount of the gelling agent mixed and the aluminum concentration in the resulting mixture fall within the aforesaid ranges, when the alumina hydrosol having the Al/Cl ratio of less than 1.0 to be commingled with the gelling agent is prepared by the method other than that of the present invention, said alumina hydrosol tends to be gelated simultaneously with addition of the gelling agent. However, provided that the second alumina hydrosol is prepared by adding hydrochloric acid to the first alumina hydrosol and the gelling agent is commingled with this second alumina hydrosol in conformity with the above-defined condition, there may be obtained a mixture having a viscosity suitable for oil-dropping, that is, in the range of from 20 cp to 60 cp.

The thus obtained mixture is dispersed as droplets in a suspending medium heated up to a temperature sufficient to give rise to hydrolysis of the gelling agent and conductive to effecting gelation of the hydrosol within a desired period of time (said medium is usually received in a vertical column). As the suspending medium can be used an oil immiscible with water such as, for instance refined paraffin oil. The temperature thereof is maintained in the range of from 50° C. to 105° C., preferably in the range of from 85° C. to 95° C. While the hydrosol passes as droplets through the suspending medium, a part of the gelling agent is hydrolyzed into ammonia, and during this period, said sol is gelated to form hydrogel. The obtained hydrogel is then aged within the oil having the same quality as the suspending medium. The temperature for this ageing is practically the same as the temperature for forming the gel, that is, it is ordinarily in the range of 50° C. to 105° C., preferably in the range of from 85° C. to 100° C., and the time for said ageing is at least 10 hours, preferably it is in the range of from 14 hours to 24 hours. In the course of this ageing process, the gelling agent remaining in spherical hydrogel particles hydrolyzes, thereby further polymerizing alumina. Thereafter, spherical alumina hydrogel particles are aged in an aqueous ammonia having an ammonia concentration in the range of from 1 wt.% to 3 wt.% at a temperature in the range of from 50° C. to 105° C. for at least about 7 hours. Upon finishing the ageing, the spherical hydrogel particles are washed with water, then are added at a temperature in the range of from 95° C. to 315° C. for 2 to 24 hours, and further are calcined at a temperature in the range of from 425° C. to 750° C. for 2 to 12 hours.

In the case of the oil dropped gamma alumina particles manufactured through the method according to the present invention, the apparent bulk density is in the range of from 0.65 g/cc to 0.71 g/cc, the total pore volume is in the range of from 0.55 cc/g to 0.65 cc/g, the content of pores having a diameter in the range of from 60 A to 110 A is at least 70% of the total pore volume, and the attrition loss is less than 0.5 wt.%. Depending on particle dimensions, for instance said alumina particles having a diameter of about 1.6 mm possess a high average crushing strength in the range of from 9 Kg to 15 Kg. In addition to the aforesaid physical properties, the alumina particles according to the present invention are also characterized in that the crystallite size measured at half width of the 440 Angstrom peak in X-ray diffraction pattern is in the range of from 43 to 47.

In this connection, it is to be noted that the pore volume and surface area referred to in the present specification are measured by virtue of the nitrogen absorption method.

As is evident from the above-detailed, according to the present invention it is possible to manufacture high apparent bulk density spherical alumina by the oil-drop method from alumina hydrosol having an Al/Cl ratio in the range of from 0.85 to 0.95 which has usually been regarded as inapplicable to the oil-drop method. Moreover, the said spherical alumina, as evidenced in the under-mentioned examples, possesses excellent physical properties and pore characteristics. In view of this, the present invention should be said to provide high industrial merits.

EXAMPLE 1

Metallic aluminum was digested in hydrochloric acid to prepare two kinds of alumina hydrosols (A) and (B). Then, each hydrosol was added with 35 wt.% of hydrochloric acid to obtain an alumina hydrosol of the same chemical composition (Al: 12.4 wt.%, Cl: 13.8 wt.%, Al/Cl ratio: 0.90). The properties of hydrosols (A) and (B) are as shown in Table 1.

TABLE 1

|  |  | Hydrosol (A) | Hydrosol (B) |
|---|---|---|---|
| Al | wt.% | 13.6 | 14.6 |
| Cl | wt.% | 11.8 | 10.4 |
| Al/Cl ratio |  | 1.15 | 1.40 |

The temperatures of hydrosol (A) and (B) were elevated by 10° to 15° C. by the addition of hydrochloric acid respectively. This means the occurrence of a chemical change such as cutting-off of the molecular size of alumina hydrosol by the action of hydrochloric acid.

Two kinds of alumina hydrosol after addition of hydrochloric acid were aged while stirring at 40° C. for 40 hours. Thereafter, each sol was commingled with hexamethylenetetramine, whereby the aluminum concentration of each mixture was made 6.5 wt.%. The amount of hexamethylenetetramine added was 1.8 times the chemical equivalent sufficient to neutralize the chloride contained in the alumina hydrosol. Each mixture was dispersed as droplets in paraffin oil maintained at elevated temperature to thereby form alumina hydrogel particles. The thus formed particles were aged first in paraffin oil and then in an aqueous ammonia, washed with water, dried and calcined thereafter, thereby obtaining spherical alumina. The properties of thus obtained two kinds of spherical alumina are as shown in Table 2.

TABLE 2

|  | Apparent volume density | Pore distribution | Crushing strength* |
|---|---|---|---|
| Spherical alumina started from hydrosol (A) | 0.68 g/cc | 40–110 Å | 10.5 Kg |
| Spherical alumina started from hydrosol (B) | 0.66 g/cc | 40–250 Å | 7.5 Kg |

*measured on the 1.6 mm - diameter particle

As is evident from the results shown in Table 2, the spherical alumina started from hydrosol (A) which corresponds to the first alumina hydrosol of the present invention is greater in the apparent volume density as well as average crushing strength and narrower in the pore distribution than the spherical alumina started from hydrosol (B) which is different from the first alumina hydrosol.

EXAMPLE 2

35 wt.% of hydrochloric acid was added to alumina hydrosol (A) employed in Example 1 to thereby prepare a second alumina hydrosol having an aluminum concentration of 12.4 wt.% and an Al/Cl ratio of 0.90. Next, this sol was divided into three, and each sol was commingled with a hexamethylenetetramine solution of different concentration, whereby three kinds of dropping mixtures were obtained. However, the amount of hexamethylenetetramine added was in each case 1.8 times the chemical equivalent necessary to neutralize the chloride contained in the sol. The aluminum concentration, viscosity and conditions at the oil-dropping time are as shown in Table 3.

TABLE 3

| Al concentration of mixtures | Viscosity | Conditions of dropping and spherical hydrogel |
|---|---|---|
| 5.0 wt. % | 16 c.p. | Possible to drop, but spherical gel is brittle. |
| 6.5 wt. % | 40 c.p. | Normal |
| 7.5 wt. % | 120 c.p. | Impossible to drop because of high viscosity |

EXAMPLE 3

The same procedure as employed in Example 1 was repeated to prepare three kinds of dropping mixture comprising the second alumina hydrosol and the hexamethylenetetramine solution. In this example, however, each mixture was unified to have an aluminum concentration of 6.5 wt.%, and only the amount of hexamethylenetetramine added to the chloride contained in each sol was changed. The properties of each mixture are as shown in Table 4.

TABLE 4

| Amount of hexa-* methylenetetramine added | Viscosity | Conditions of dropping and spherical hydrogel |
|---|---|---|
| 1.5 times | 14 c.p. | Possible to drop, but not gelated within the predetermined time. |
| 1.8 times | 40 c.p. | Normal |
| 2.0 times |  | gelation occurred in the course of mixing |

*versus the chemical equivalent necessary to neutralize the chloride contained in alumina hydrosol.

The results shown in Table 3 and Table 4 indicate that the mixing ratio of the gelling agent (hexamethylenetetramine) to the second alumina hydrosol according to the present invention and the aluminum concentration of obtained mixture are extremely critical to the present invention.

What is claimed is:

1. A method of manufacturing a catalyst carrier consisting essentially of substantially spherical gamma alumina particles having an apparent bulk density in the range of from 0.65 g/cc to 0.71 g/cc, a total pore volume measured by the nitrogen adsorption method in the range of from 0.55 cc/g to 0.65 cc/g, a content of pores having a diameter in the range of from 60 Angstroms to 110 Angstroms of at least 75% of the total pore volume, a surface area measured by the nitrogen adsorption method in the range of from 210 m$^2$/g to 250 m$^2$/g, and an attrition loss of less than 0.5 wt.%, which comprises the steps of
   (a) preparing a first alumina hydrosol having an aluminum concentration in the range of from 9.8 wt.% to 14.4 wt.% and a weight ratio of aluminum to chloride in the range of from 0.95 to 1.20,
   (b) then adding hydrochloric acid to said first aluminum hydrosol in proportions effective to form a second alumina hydrosol having an aluminum concentration in the range of from 9.5 wt.% to 13.0 wt.% and a weight ratio of aluminum to chloride in the range of from 0.85 to 0.95,
   (c) then commingling said second alumina hydrosol with a gelling agent which is hydrolyzable at an elevated temperature wherein the amount of said gelling agent is from 1.65 to 1.85 times the chemical equivalent necessary to neutralize the chloride contained in said second alumina hydrosol and thereby obtaining a mixture having an aluminum concentration in the range of from 6.0 wt.% to 7.0 wt.%, and (d) then dispersing said mixture as droplets in a suspending medium under conditions effective to transform said droplets into hydrogel particles, ageing said hydrogel particles in said suspending medium and then in aqueous ammonia, then washing said hydrogel particles with water, then drying and then calcining said hydrogel particles to obtain said gamma alumina particles.

2. A method according to claim 1 wherein said first alumina hydrosol is prepared by digesting metallic aluminum in hydrochloric acid.

3. A method according to claim 1 wherein said first alumina hydrosol is prepared by reacting metallic aluminum with a basic aluminum chloride solution having an aluminum concentration in the range of from 7 wt.% to 12 wt.% and a weight ratio of aluminum chloride in the range of from 0.3 to 0.8, said basic aluminum chloride solution being obtaining by reacting gibbsite with hydrochloric acid at an elevated temperature.

4. A method according to claim 1 wherein the second alumina hydrosol is aged at a temperature above 40° C. for more than 40 hours before being dispersed in said suspending medium.

* * * * *

UNITED STATES PATENT AND TRADEMARK OFFICE
CERTIFICATE OF CORRECTION

PATENT NO. : 4 301 033
DATED : November 17, 1981
INVENTOR(S) : Shizuo Takumi et al It is certified that error appears in the above—identified patent and that said Letters Patent is hereby corrected as shown below:

Column 8, line 8; after "aluminum" insert ---to---.

Signed and Sealed this

Seventeenth Day of August 1982

[SEAL]

Attest:

GERALD J. MOSSINGHOFF

Attesting Officer — Commissioner of Patents and Trademarks